United States Patent
Uruno et al.

(10) Patent No.: US 7,299,121 B2
(45) Date of Patent: Nov. 20, 2007

(54) ELECTRONIC CONTROL DEVICE FOR AVIATION ENGINE

(75) Inventors: Hiroshi Uruno, Saitama (JP); Akira Hamauzu, Saitama (JP); Kiyoaki Yokoyama, Saitama (JP); Hirohisa Kitaura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 11/394,094

(22) Filed: Mar. 31, 2006

(65) Prior Publication Data
US 2006/0235601 A1 Oct. 19, 2006

(30) Foreign Application Priority Data
Mar. 31, 2005 (JP) ............... 2005-102630

(51) Int. Cl.
G06F 19/00 (2006.01)
F02P 5/00 (2006.01)
(52) U.S. Cl. ............... 701/101; 701/114; 123/406.11
(58) Field of Classification Search ............... 701/101, 701/102, 114, 115; 123/609, 625, 406.11, 123/406.12
See application file for complete search history.

(56) References Cited

U.S. PATENT DOCUMENTS

| | | | |
|---|---|---|---|
| 4,656,588 A * | 4/1987 | Kubo | ............... 701/76 |
| 5,140,592 A * | 8/1992 | Idleman et al. | ............... 714/5 |
| 5,274,645 A * | 12/1993 | Idleman et al. | ............... 714/6 |
| 5,422,808 A * | 6/1995 | Catanese et al. | ............... 700/79 |
| 6,357,427 B1 | 3/2002 | Luttrelll et al. | |
| 6,591,167 B1 * | 7/2003 | Minowa et al. | ............... 701/1 |

* cited by examiner

Primary Examiner—John T. Kwon
(74) Attorney, Agent, or Firm—Birch, Stewart, Kolasch & Birch, LLP

(57) ABSTRACT

An electronic control device is provided for an aviation engine. Each cylinder of the engine is equipped with main ignition plugs and back-up ignition plugs. Lane A including a first CPU and lane B including a second CPU are included in an ECU. The ignition control system is multiplexed by the two lanes A, B. The first and second CPU independently calculate ignition timing for each cylinder based on each sensor signal, and then exchange the results of these calculations with each other. At each cylinder, ignition timing is synchronized in such a manner that ignition timing of the main ignition plugs and ignition timing of the back-up ignition plugs match. The electronic control device so configured has a high level of redundancy with a small number of CPU's. Thus, electronic control device can be provided for the aviation engine with few limitations placed in relation to installation location.

20 Claims, 5 Drawing Sheets

US 7,299,121 B2

ELECTRONIC CONTROL DEVICE FOR AVIATION ENGINE

CROSS-REFERENCE TO RELATED APPLICATION

The present application claims priority under 35 U.S.C. §119 to Japanese Patent Application Ser. No. 2001-284060, filed Sep. 18, 2001, the entire contents of which are hereby incorporated by reference.

BACKGROUND OF THE INVENTION

1. Field of the Invention

The present invention relates to an electronic control device for an aviation engine and particularly relates to an electronic control device for an aviation engine for automatically controlling all fuel consumption and ignition timing etc. using a computer.

2. Description of Background Art

FADEC (Full Authority Digital Engine Control) is a generic name for a system for electronically controlling an aviation engine, that receives information regarding the position of a throttle lever operated by a pilot and the engine, together with various information from various sensors fitted to the aviation craft, and controls the engine so as to obtain optimum engine thrust. Engine control is therefore electrical rather than mechanical as a result of adoption of FADEC, which enables improved responsiveness and accurate engine control. Further transmission of signals from the throttle lever in the cockpit to the engine are also changed to being electrical signals in a wire rather than carried out mechanically using cables as a result of the adoption of FADEC. This kind of FADEC is disclosed, for example, in U.S. Pat. No. 6,357,427 B1.

FIG. 4 is a block view of an ignition control system for a four cylinder aviation engine of the related art to which FADEC is applied, and shows a configuration where two ECU's 100 and 200 control two cylinders at a time independently. Each cylinder is equipped with main ignition plugs (1T to 4T) and back-up ignition plugs (1B to 4B) for backing these up.

At the first ECU 100, the main ignition plug 1T of the first cylinder and the back-up ignition plug 2B of the second cylinder are supplied with electricity by the simultaneous ignition type first ignition coil 21. The back-up ignition plug 1B of the first cylinder and the main ignition plug 2T of the second cylinder are supplied with electricity by the simultaneous ignition type second ignition coil 22. The first CPU 11 and second CPU 12 are connected via the first and second igniters 31 and 32 upstream of the first and second ignition coils 21, 22. The first and second CPU 11 and 12 acquire crank speed and cam timing via the sensor input interface 41 and control energizing of the ignition coils 21, 22 using ignition timing decided based on this information.

Similarly, at the second ECU 200, the main ignition plug 3T of the third cylinder and the back-up ignition plug 4B of the fourth cylinder are supplied with electricity by the simultaneous ignition type first ignition coil 23. The back-up ignition plug 3B of the third cylinder and the main ignition plug 4T of the fourth cylinder are supplied with electricity by the simultaneous ignition type fourth ignition coil 24. The third CPU 13 and fourth CPU 14 are connected via the third and fourth igniters 33 and 34 upstream of the third and fourth ignition coils 23, 24.

The third and fourth CPU 13 and 14 acquire crank speed and cam timing via the sensor input interface 42 and control energizing of the ignition coils 23, 24 using ignition timing decided based on this information.

According to this configuration, the main ignition plugs and the back-up ignition plugs are always ignited at all of the cylinders by each of the simultaneous ignition type ignition coils 21 to 24. This means that if one of the systems goes down at one ECU, this is compensated for by each cylinder of the other system firing. Namely, a redundancy function is implemented for the engine ignition.

FIG. 5 is a block view of a fuel injection system for a four cylinder aviation engine of the related art applied to FADEC, with the same numerals as before showing the same functions.

A normal injection signal line from the first CPU 11 is secured at the first injector 1J injecting fuel to within the first cylinder 1 via a high-side driver 51 with a current limiter. The normal injection signal outputted from the driver 51 is always monitored by the second CPU 12. Further, an alternate injection signal line from the second CPU 12 is secured at the first injector via a high side driver 56 with a current limiter.

Similarly, a normal injection signal line from the second CPU 12 is secured at the first injector 2J injecting fuel to within the first cylinder 2 via a high-side driver 52 with a current limiter. The normal injection signal outputted from the driver 52 is always monitored by the first CPU 121. Further, an alternate injection signal line from the first CPU 11 is secured at the second injector via a high side driver 55 with a current limiter.

Similarly, normal injection signal line from the third CPU 13 is secured at the third injector 3J injecting fuel to within the third cylinder 3 via a high-side driver 53 with a current limiter. The normal injection signal outputted from the driver 53 is always monitored by the fourth CPU 14. Further, an alternate injection signal line from the fourth CPU 14 is secured at the third injector via a high side driver 58 with a current limiter.

Similarly, normal injection signal line from the fourth CPU 14 is secured at the fourth injector 4J injecting fuel to within the fourth cylinder 4 via a high-side driver 54 with a current limiter. The normal injection signal outputted from the driver 54 is always monitored by the third CPU 13. Further, an alternate injection signal line from the third CPU 13 is secured at the fourth injector via a high side driver 57 with a current limiter.

In this configuration, each CPU calculates the amount of normal injection and the amount of alternate injection so that, for example, in the case of the first CPU 11, the amount for the normal injection for the first injector 1J and the amount for the alternate injection for the second injector 2J is calculated. In this way, if a normal injection signal is not outputted by the high side driver 52 with a current limiter even after a predetermined time elapses from the timing of the start of injection obtained from the alternate injection amount, it is determined that an abnormality has occurred at the normal injection system of the second injector 2J and an alternate injection signal is outputted.

The technology of the related art described above has the following technological problems.

(1) An expensive CPU is required for each of the cylinders.

(2) Each ECU only carries out control of two cylinder sections. This means that ignition control and fuel injection control for two cylinders is not possible when, for example, there is an accident such as damage or disengagement etc. of a connector for the sensor input interface.

(3) Each CPU operates independently. This means that in cases where complex ignition control such as lag angle control and advance angle control etc. is carried out taking not only crank and cam timing but also detection signals such as for an intake negative pressure sensor or nock sensor etc. as parameters, errors occur in the results of calculations of each CPU. As a result, in the case of ignition control, a shift occurs in the ignition timing of the main ignition plug and the ignition timing of the back-up ignition plug at each cylinder.

(4) The casing for the ECU is large for the type where an ignition coil is built into the ECU and restrictions on the fitting position are therefore substantial. When the ECU is fitted at a position away from the engine, the distance between the ignition coil and the ignition plug becomes substantial and the long high tension cable is therefore necessary. Because of this, not only is secondary energy loss in ignition substantial and a fall in voltage supplied to the ignition plug invited, but also influence on emission performance is substantial.

SUMMARY AND OBJECTS OF THE INVENTION

In order to resolve the aforementioned problems, it is the object of the present invention to bring about a high level of redundancy with a small number of CPU's, so as to provide an electronic control device for an aviation engine with few limitations placed in relation to installation location.

According to a first aspect of the present invention, an electronic control device for an aviation engine for multi-plex-controlling a multi-cylinder aviation engine using digital signals includes an ECU containing at least: a plurality of sensors for monitoring states of the engine, a first CPU for executing main control of all cylinders, a second CPU for executing back-up control of all cylinders, a communication circuit connected to the first and second CPU, and a sensor input interface for supplying detection signals of the sensors to each of the first and second CPU's, wherein a control system is multiplexed using a first lane containing the first CPU and a second lane containing the second CPU, and the first and second CPUs are mutually synchronized to control timing through communication using the communication circuit.

According to a second aspect of the present invention, sensor input interfaces are provided independently so as to correspond to the first and second CPU's respectively.

According to a third aspect of the present invention, the aviation engine is a four cylinder engine where each cylinder is equipped with a main ignition plug and a back-up ignition plug, including a simultaneous ignition-type first ignition coil, controlled by the first CPU, for supplying ignition energy to the main ignition plugs of the first and second cylinders, a simultaneous ignition-type second ignition coil, controlled by the first CPU, for supplying ignition energy to third and fourth cylinders, a simultaneous ignition type third ignition coil, controlled by the second CPU, for supplying ignition energy to the first and second cylinder back-up ignition plugs, and a simultaneous ignition type first ignition coil, controlled by the second CPU, for supplying ignition energy to the back-up ignition plugs of the third and fourth cylinders, with each ignition coil being arranged outside of the ECU.

According to a fourth aspect of the present invention, the aviation engine is provided with an injector at each cylinder, and comprises a normal signal system for supplying a normal injection signal from the first CPU to injectors of all of the cylinders, an alternate signal system for supplying an alternate signal from the second CPU to injectors of all of the cylinders, switching means for selectively connecting one of the normal signal system and the alternate signal system to the injectors of all of the cylinders, and means for notifying the first CPU of the operating conditions for the normal signal system, wherein when an abnormal operation of the normal signal system is detected by the first CPU when the normal signal system is connected to the injectors of all of the cylinders, the switching means is controlled so that the alternate signal system is connected to the injectors of all of the cylinders.

According to the present invention, the following effects are achieved:

According to the first aspect of the invention, each CPU independently controls all of the cylinders. This means that if one CPU or the lane thereof malfunctions, control of all the cylinders is continued by the other CPU or its lane. However, each CPU is capable of mutually communicating and control timing can therefore by synchronized.

According to the second aspect of the invention, a sensor input interface is provided for each CPU. This means that even if one sensor input interface malfunctions so that control using the lane including the sensor input interface is impossible, it is possible for control of all of the cylinders to be continued using the lane including the other CPU.

According to the third aspect of the invention, it is possible to carry out ignition control in parallel using each CPU. This means that even if a lane including one CPU malfunctions, it is possible to continue ignition control using the lane including the other CPU without carrying out lane switching.

According to the fourth aspect invention of claim 4, even in cases where the control subject is switched over from a lane including one CPU to a lane including the other CPU, each CPU communicates with each other so that synchronization of control timing is always established and superior lane switching can therefore be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
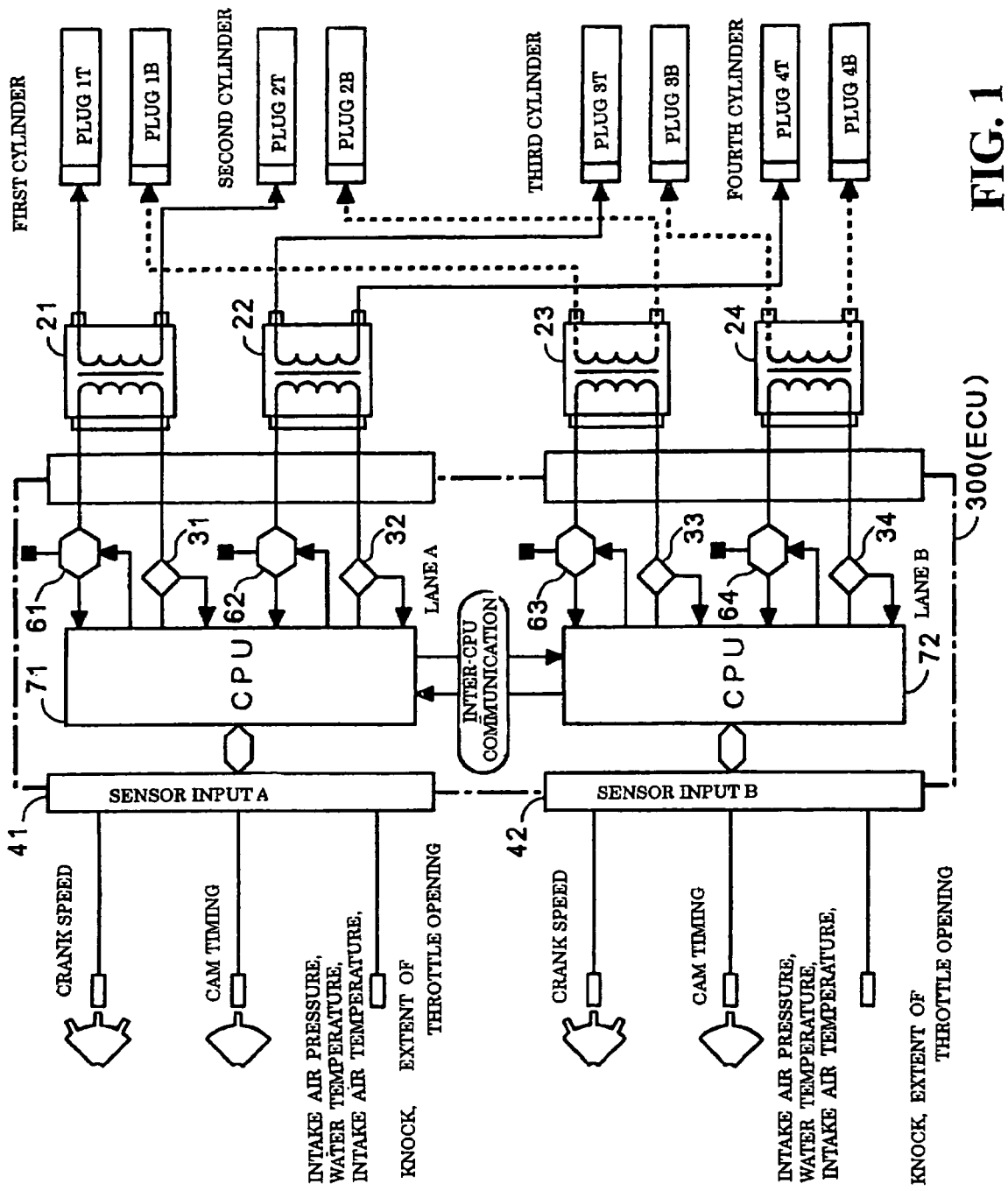
FIG. 1 is a block view of an ignition control device for use with an aviation engine of a first embodiment of the present invention.

A detailed description will now be given of preferred embodiments of the present invention with reference to the drawings. FIG. 1 is a block view showing a block view of an ignition control device for use with an aviation engine of a first embodiment of the present invention.

Each cylinder is equipped with main ignition plugs (1T to 4T) and back-up ignition plugs (1B to 4B) for backing these up. Lane A including CPU 71 and lane B including CPU 72 are included at ECU 300 and the ignition control system is multiplexed by these two lanes A, B.

At lane A, the main ignition plug 1T of the first cylinder and the main ignition plug 2T of the second cylinder are supplied with electricity by the simultaneous ignition type first ignition coil 21. The main ignition plug 3T of the third cylinder and the main ignition plug 4T of the fourth cylinder are supplied with electricity by the simultaneous ignition type second ignition coil 22. The primary sides of each of the ignition coils 21, 22 are connected to power supply lines via high side power switches 61, 62 with current limiting circuits and are connected to the first CPU 71 via igniters 31, 32. The first CPU 71 calculates ignition timing for all of the cylinders based on various sensor signals inputted via the sensor input interface 41 and executes main ignition based on the results of these calculations.

At lane B, the back-up ignition plug 1B of the first cylinder and the back-up ignition plug 2B of the second cylinder are supplied with electricity by the simultaneous ignition type third ignition coil 23. The back-up ignition plug 3B of the third cylinder and the back-up ignition plug 4B of the fourth cylinder are supplied with electricity by the simultaneous ignition type fourth ignition coil 24. The primary sides of each of the ignition coils 23, 24 are connected to power supply lines via high side power switches 63, 64 with current limiting circuits and are connected to the second CPU 72 via igniters 33, 34.

The first and second CPU 71 and 72 independently calculate ignition timing for each cylinder based on each sensor signal and exchange the results of these calculations with the other CPU through communication. At each cylinder, ignition timing is synchronized in such a manner that ignition timing of the main ignition plugs (1T to 4T) and ignition timing of the back-up ignition plugs (1B to 4B) match. Therefore, even if a malfunction occurs in one lane so that one of either the main ignition or the back-up ignition fails, continuation is possible using the other of the main ignition or the back-up ignition using the remaining lane.

Figure 2:
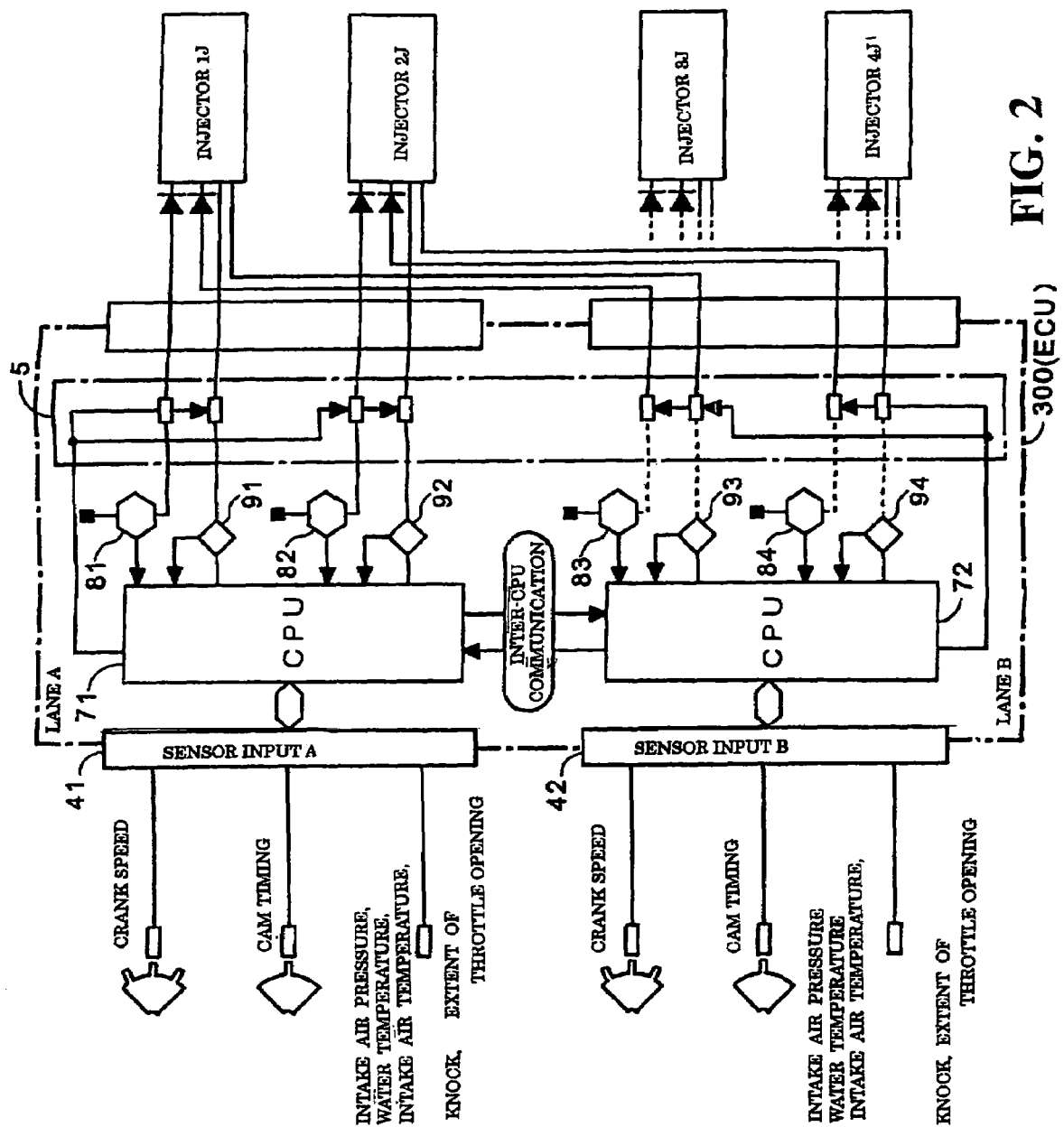
FIG. 2 is a block view of a fuel injection system for use with an aviation engine of a second embodiment of the present invention.

FIG. 2 is a block view of a fuel injection system for an aviation engine of a second embodiment of the present invention, with the same numerals as before showing the same functions. Lane A including CPU 71 and lane B including CPU 72 are included at ECU 300 and the fuel injection system is multiplexed by these two lanes A, B.

When a signal line for normal injection is ensured from the first CPU 71 of the lane A via an injector driver 91 at the first injector 1J injecting fuel to within the first cylinder, a power supply line for normal injection is ensured via a high side power switch 81 with a current limiter. Operation of the driver 91 and switch 81 is monitored by the first CPU 71. Further, when a signal line for alternate injection use is ensured at the first injector 1J from that second CPU 72 of lane B via an injector driver 93, a power supply line for alternate injection use is ensured via a high side power switch 83 with a current limiter. Operation of the driver 93 and switch 83 are monitored by the second CPU 72.

Similarly, when a signal line for normal injection is ensured from the first CPU 71 of the lane A via an injector driver 92 at the second injector 2J injecting fuel to within the first cylinder, a power supply line for normal injection is ensured via a high side power switch 82 with a current limiter. Operation of the driver 92 and switch 82 is monitored by the first CPU 71. Further, when a signal line for alternate injection use is ensured at the second injector 2J from that second CPU 72 of lane B via an injector driver 94, a power supply line for alternate injection use is ensured via a high side power switch 84 with a current limiter. Operation of the driver 94 and switch 84 are monitored by the second CPU 72.

Although not shown in the drawings, at the third injector 3J injecting fuel to within the third cylinder and a fourth injector 4J injecting fuel into the fourth cylinder, as with the first and second injectors J1 and J2, a signal line for normal injection use and a power supply line are ensured with the first CPU 71 of the lane A, and a signal line for alternate injection and power supply line are ensured with the second CPU 72 of lane B. A lane switching circuit 5 selectively connects just one of the signal line for normal injection and the signal line for alternate signal use to each injector.

Figure 3:
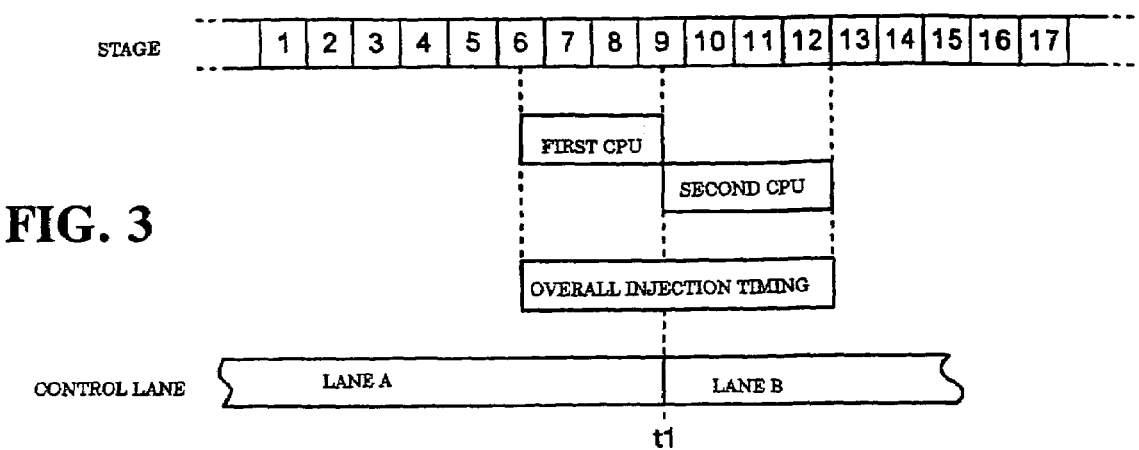
FIG. 3 is a view showing lane switching timing of a second embodiment of the present invention.
Figure 4:
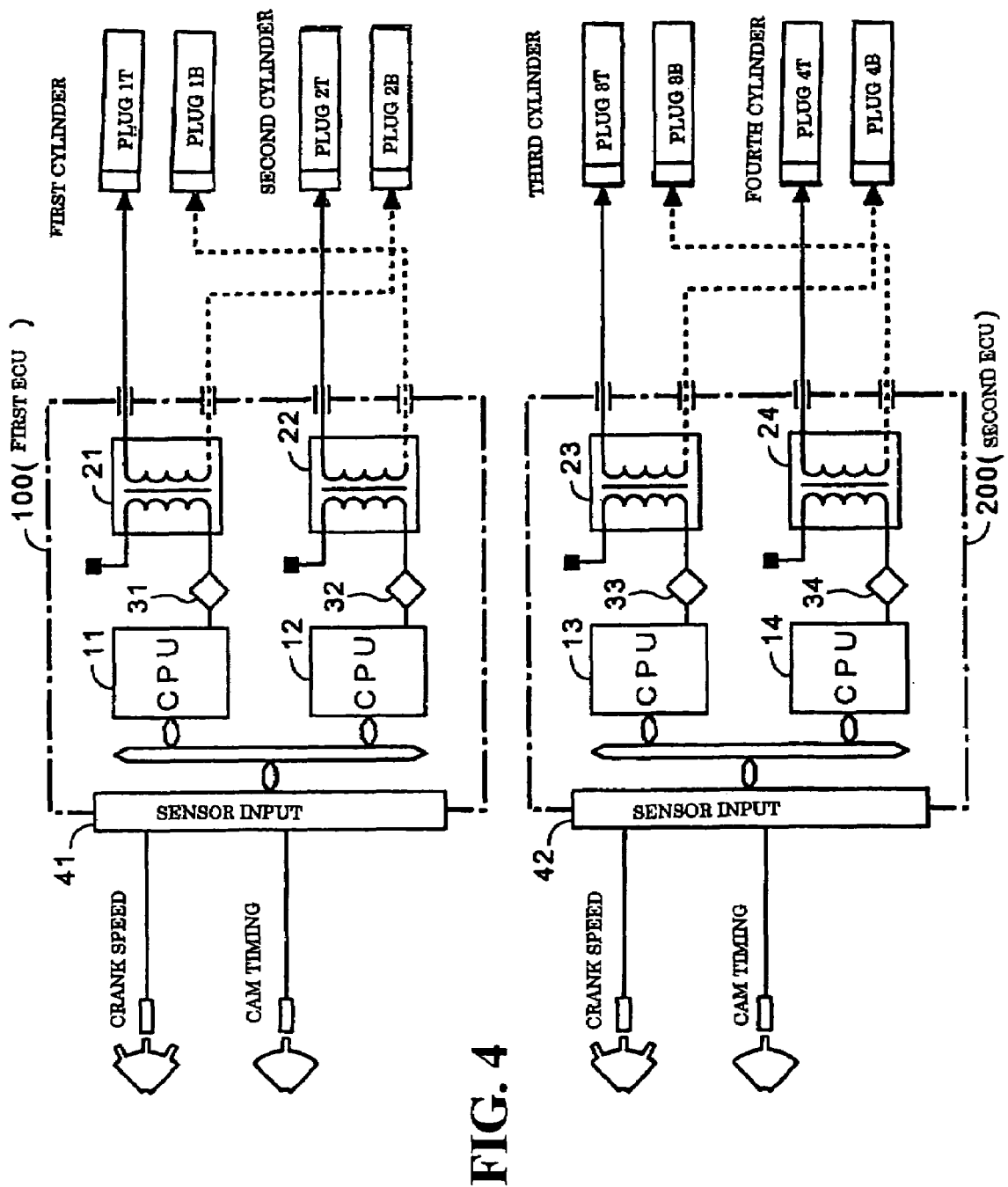
FIG. 4 is a block view of an ignition control system of an aviation engine of the related art applied to a FADEC.
Figure 5:
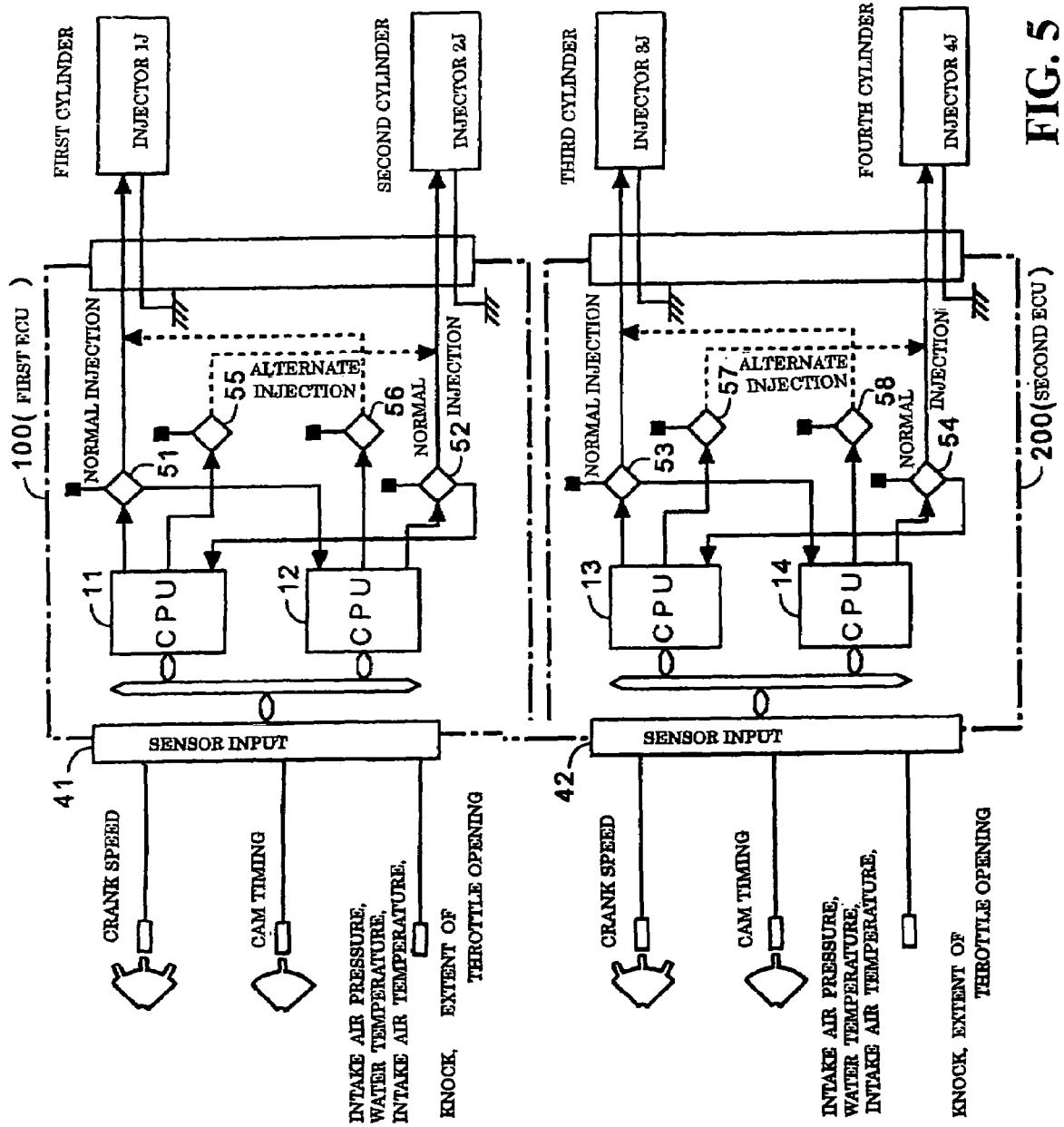
FIG. 5 is a block view of a fuel injection system of an aviation engine of the related art applied to a FADEC.

In the above configuration, lane A (front side) is always selected by the lane switching circuit and all of the injectors are controlled by the first CPU 71. As shown in the example in FIG. 3, when fuel injection is controlled by lane A, when a malfunction occurs at lane A due to whatever cause at time t1 so that this is detected by signal return monitoring of the drivers 91, 92 and/or power switches 81, 82, the control lane is switched over from lane A to lane B (alternate side) by the lane switching circuit 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic control device for an aviation engine for multiplex-controlling a multi-cylinder aviation engine using digital signals, comprising:
    an ECU, the ECU including:
        a plurality of sensors for monitoring states of the engine,
        a first CPU for executing main control of all cylinders,
        a second CPU for executing back-up control of all cylinders,
        a communication circuit connected to the first and second CPU's, and
        a sensor input interface for supplying detection signals of the sensors to each of the first and second CPUs,
    wherein a control system is multiplexed using a first lane including the first CPU and a second lane containing the second CPU, and
    wherein the first and second CPUs are mutually synchronized to control timing through communication using the communication circuit.

2. The electronic control device for an aviation engine of claim 1, wherein the two sensor input interfaces are provided independently so as to correspond to the first and second CPUs respectively.

3. The electronic control device for an aviation engine of claim 1,
    wherein the aviation engine is a four cylinder engine, and
    wherein each of the cylinders is equipped with a main ignition plug and a back-up ignition plug, the control device including a first simultaneous ignition coil, controlled by the first CPU, for supplying ignition energy to the main ignition plugs of the first and second cylinders, a second simultaneous second ignition coil, controlled by the first CPU, for supplying ignition energy to the third and fourth cylinders, a third simultaneous ignition coil, controlled by the second CPU, for supplying ignition energy to the first and second cylinder back-up ignition plugs, and a fourth simultaneous ignition coil, controlled by the second CPU, for supplying ignition energy to the back-up ignition plugs of the third and fourth cylinders, with each of the ignition coils being arranged outside of the ECU.

4. The electronic control device for an aviation engine of claim 2, wherein the aviation engine is a four cylinder engine, and wherein each of the cylinders is equipped with a main ignition plug and a back-up ignition plug, the control device including a first simultaneous ignition coil, controlled by the first CPU, for supplying ignition energy to the main ignition plugs of the first and second cylinders, a second simultaneous ignition coil, controlled by the first CPU, for supplying ignition energy to third and fourth cylinders, a third simultaneous ignition coil, controlled by the second CPU, for supplying ignition energy to the first and second cylinder back-up ignition plugs, and a fourth simultaneous ignition coil, controlled by the second CPU, for supplying ignition energy to the back-up ignition plugs of the third and fourth cylinders, with each of the ignition coils being arranged outside of the ECU.

5. The electronic control device for an aviation engine of claim 1, wherein the aviation engine is provided with an injector at each cylinder, and further comprises:

a normal signal system for supplying a normal injection signal from the first CPU to the injectors of all of the cylinders, an alternate signal system for supplying an alternate signal from the second CPU to the injectors of all of the cylinders, switching means for selectively connecting one of the normal signal system and the alternate signal system to the injectors of all of the cylinders, and means for notifying the first CPU of the operating conditions for the normal signal system, wherein when an abnormal operation of the normal signal system is detected by the first CPU when the normal signal system is connected to the injectors of all of the cylinders, the switching means being controlled so that the alternate signal system is connected to the injectors of all of the cylinders.

6. The electronic control device for an aviation engine of claim 2, wherein each of the first and second ignition coils has a primary side connected respectively to a power supply line via first and second high side power switches, the primary side also being connected respectively to the first CPU via first and second igniters.

7. The electronic control device for an aviation engine of claim 1, wherein the first CPU calculates ignition timing for all of the cylinders based on various sensor signals inputted via the sensor input interface and executes main ignition based on results of the calculations.

8. The electronic control device for an aviation engine of claim 2, wherein each of the third and fourth ignition coils a primary side connected respectively to a power supply line via third and fourth high side power switches, the primary side also being connected respectively to the second CPU via third and fourth igniters.

9. The electronic control device for an aviation engine of claim 5, wherein the switching means selectively connects only one of a normal injection signal line and an alternate injection signal line to each of the injectors.

10. The electronic control device for an aviation engine of claim 5, when fuel injection is controlled by the first lane, and a malfunction occurs in the first lane, the malfunction is detected by signal return monitoring of drivers or power switches of the first lane, control is switched over from the first lane to the second lane by the switching means.

11. An electronic control device for an aviation engine for multiplex-controlling a multi-cylinder aviation engine using digital signals, comprising:

an ECU, the ECU including:

a plurality of sensors for monitoring states of the engine, a first CPU for executing main control of all cylinders, a second CPU for executing back-up control of all cylinders, a communication circuit connected to the first and second CPU's, and a sensor input interface for supplying detection signals of the sensors to each of the first and second CPUs, wherein a control system is multiplexed using a first lane including the first CPU and a second lane containing the second CPU, and wherein the first and second CPUs are mutually synchronized to control timing through communication using the communication circuit, wherein the cylinders are connected in parallel to the ECU.

12. The electronic control device for an aviation engine of claim 11, wherein the two sensor input interfaces are provided independently so as to correspond to the first and second CPUs respectively.

13. The electronic control device for an aviation engine of claim 11, wherein the aviation engine is a four cylinder engine, and wherein each of the cylinders is equipped with a main ignition plug and a back-up ignition plug, including a first simultaneous ignition coil, controlled by the first CPU, for supplying ignition energy to the main ignition plugs of the first and second cylinders, a second simultaneous ignition coil, controlled by the first CPU, for supplying ignition energy to third and fourth cylinders, a third simultaneous ignition coil, controlled by the second CPU, for supplying ignition energy to the first and second cylinder back-up ignition plugs, and a fourth simultaneous ignition coil, controlled by the second CPU, for supplying ignition energy to the back-up ignition plugs of the third and fourth cylinders, with each of the ignition coils being arranged outside of the ECU.

14. The electronic control device for an aviation engine of claim 12, wherein the aviation engine is a four cylinder engine, and wherein each of the cylinders is equipped with a main ignition plug and a back-up ignition plug, including a first simultaneous ignition coil, controlled by the first CPU, for supplying ignition energy to the main ignition plugs of the first and second cylinders, a second simultaneous ignition coil, controlled by the first CPU, for supplying ignition energy to third and fourth cylinders, a third simultaneous ignition coil, controlled by the second CPU, for supplying ignition energy to the first and second cylinder back-up ignition plugs, and a fourth simultaneous ignition coil, controlled by the second CPU, for supplying ignition energy to the back-up ignition plugs of the third and fourth cylinders, with each of the ignition coils being arranged outside of the ECU.

15. The electronic control device for an aviation engine of claim 11, wherein the aviation engine is provided with an injector at each cylinder, and further comprises:

a normal signal system for supplying a normal injection signal from the first CPU to injectors of all of the cylinders, an alternate signal system for supplying an alternate signal from the second CPU to the injectors of all of the cylinders, switching means for selectively connecting one of the normal signal system and the alternate signal system to the injectors of all of the cylinders, and means for notifying the first CPU of the operating conditions for the normal signal system, wherein when an abnormal operation of the normal signal system is detected by the first CPU when the normal signal system is connected to the injectors of all of the cylinders, the switching means being controlled so that the alternate signal system is connected to the injectors of all of the cylinders.

16. The electronic control device for an aviation engine of claim 12, wherein each of the first and second ignition coils has a primary side connected respectively to a power supply line via first and second high side power switches, the primary side also being connected respectively to the first CPU via first and second igniters.

17. The electronic control device for an aviation engine of claim 11, wherein the first CPU calculates ignition timing for all of the cylinders based on various sensor signals inputted via the sensor input interface and executes main ignition based on results of the calculations.

18. The electronic control device for an aviation engine of claim 12, wherein each of the third and fourth ignition coils has a primary side connected respectively to a power supply line via third and fourth high side power switches, the primary side also being connected respectively to the second CPU via third and fourth igniters.

19. The electronic control device for an aviation engine of claim 15, wherein the switching means selectively connects just one of a normal injection signal line and an alternate injection signal line to each of the injectors.

20. The electronic control device for an aviation engine of claim 15, when fuel injection is controlled by the first lane, and a malfunction occurs in the first lane, the malfunction is detected by signal return monitoring of drivers or power switches of the first lane, control is switched over from the first lane to the second lane by the switching means.

* * * * *